United States Patent Office 3,154,476
Patented Oct. 27, 1964

3,154,476
PROCESS FOR PRODUCTION OF 7-CHLORO-6-DEMETHYLTETRACYCLINE
Saul L. Neidleman, Highland Park, N.J., assignor to Olin Mathieson Chemical Corporation, New York, N.Y., a corporation of Virginia
No Drawing. Filed Apr. 29, 1963, Ser. No. 276,165
7 Claims. (Cl. 195—80)

This invention relates to an improved process for the production of 7-chloro-6-demethyltetracycline and, more particularly, to an improvement in the process of producing 7-chloro-6-demethyltetracycline by culturing 7-chlorotetracycline-producing strains of Streptomyces.

Prior to the present invention, 7-chloro-6-demethyltetracycline has been produced by culturing selected mutant strains of S. aureofaciens in contact with nutrient media of varying compositions. The antibiotic thus produced is characterized by extreme chemical stability, notably in strong acid and alkali solutions, and by its increased retention in the circulatory system of man. Hence, the therapeutic importance of the 7-chloro-6-demethyltetracycline is unquestionable. It is, therefore, desirable that the simplest and most effective procedure for the production of this antibiotic be provided. This means, of course, that it is highly desirable to achieve the production of 7-chloro-6-demethyltetracycline with a minimum of restriction on the source of microorganism which can be employed and without the burden of selecting particular strains of microorganisms for use in the fermentation process for producing 7-chloro-6-demethyltetracycline.

It has been found in accordance with the present invention that 7-chloro-6-demethyltetracycline can be produced in good yield from any 7-chlorotetracycline-producing strain of streptomyces when a compound selected from the group consisting of S-2-chloroethyl-DL- homocysteine hydrochloride, S-2-hydroxy-ethyl-DL-homocysteine, DL-α-amino-γ-methoxybutyric acid, S-2-n-propyl-DL-homocysteine is added to a growing culture of a 7-chlorotetracycline-producing strain of Streptomyces.

The amounts of the compounds which may be employed from this invention may vary from .05 g. to about 2 g. per liter of fermentation employed in the practice of this invention.

Among the tetracycline producing strains of Streptomyces which have been sucessfully employed in the preparation of 7-chloro-6-demethyltetracycline by the novel process of the present invention are the following: S. aureofaciens (ATCC 13899); S. aureofaciens ATCC 13900); S. aureofaciens (ATCC 12416a); S. aureofaciens (ATCC 12416b); S. aureofaciens (ATCC 12416c); S. aureofaciens (NRRL B;1288); S. aureofaciens (NRRL 2209); S. aureofaciens (NRRL B–1286); S. aureofaciens (NRRL B–1287); and S. viridofaciens (ATCC 11989).

The fermentation procedure employed in the novel process of the present invention may be carried out in accordance with the conditions generally employed in the production of tetracycline. Thus, the nutrient medium, conditions of time, temperature and pH control, aeration, and the like will conform to those employed in the production of tetracycline as set out in U.S. Patent No. 2,734,018.

When a fermentation medium is supplemented with biologically available chloride, 7-chlorotetracycline and 7-chloro-6-demethyltetracycline will form to the near exclusion of tetracycline.

In addition to the foregoing, it has also been found that good results may be obtained by the use in combination of small amounts of aminopterin with either S-2-n-propyl-DL-homocysteine or S-2-isopropyl - DL - homocysteine to obtain 7-chloro-6-demethyltetracycline.

The following examples are illustrative of the practice of this invention:

Example 1

A culture of Streptomyces aureofaciens (ATCC 13900) is grown in approximately 50 ml. of an aqueous medium containing, per 1000 ml., 30 gms. extraction process soybean meal, 1 gm. sodium chloride, 50 gms. glucose and 7 gms. calcium carbonate in a 250 ml. Erlenmeyer flask. The flask is agitated on a rotary shaker (280 cycles per minute) in a room maintained at 25° C. for a period of 72 hours. Ten percent of the resulting inoculum is then transferred to a 250 ml. Erlenmeyer flask containing 50 ml. of the medium employed above and the flask agitated a further 72 hours under the same conditions. One ml. of the resulting inoculum is then employed for the inoculation of 10 ml. of an aqueous medium containing, per 1000 ml., 30 gms. extraction process soybean meal, 1 gm. sodium chloride, 50 gms. glucose and 7 gms. calcium carbonate, in a 1" x 6" test tube. In addition, 1 mg. of sterile S-2-hydroxyethyl-DL-homocysteine is added to the tube and the tube is shaken on a rotary shaker at 280 cycles per minute at 25° C. for seven days. The contents of the tube were then acidified to pH 2 by the addition of sulfuric acid and centrifuged. Examination of the supernatant liquid by paper chromatography employing the methods of Bohonos et al. Antibiotics Annual (1953–4, page 49) demonstrates the presence of 7-chloro-6-demethyltetracycline, 7-chlorotetracycline and tetracycline.

Example 2

The procedure of Example 1 is carried out except that 20 mg. sterile DL-α-amino-γ-methoxybutyric acid is used in place of S-2-hydroxyethyl-DL-homocysteine. Examination of the supernatant liquid by the paper chromatographic method employed in Example 1 shows the presence of 7-chloro-6-demethyltetracycline in the product which is obtained.

Example 3

The procedure of Example 1 is carried out except that 5 mg. of S-2-chloroethyl-DL-homocysteine hydrochloride is used in place of S-2-hydroxyethyl-DL-homocysteine. Examination of the supernatant liquid by the paper chromatographic method employed in Example 1 shows the presence of 7-chloro-6-demethyltetracycline in the product which is obtained.

Example 4

The procedure of Example 1 is carried out except that 10 mg. of sterile S-2-n-propyl-DL-homocysteine is used in place of S-2-hydroxyethyl-DL-homocysteine. Examination of the supernatant liquid by the paper chromatographic method employed in Example 1 shows the presence of 7-chloro-6-demethyltetracycline in the product which is obtained.

Similarly, following the procedure set forth in Example 4 but substituting an equivalent amount of S-2-isopropyl-DL - homocysteine for S-2-n-propyl - DL - homocysteine, there is obtained 7-chloro-6-demethyltetracycline.

Example 5

To a 250 ml. Erlenmeyer flask containing 50 ml. of an aqueous medium containing, per 1000 ml., 30 gms. extraction process soybean meal, 50 gms. glucose, 7 gms. calcium carbonate and 1 gm. sodium chloride there is added 10 mg. of sterile S-2-n-propyl-DL-homocysteine and 1 mg. of sterile aminopterin and 1 ml. of an inoculum of S. aureofaciens (ATCC 13900) prepared as in Example 1. The flask is shaken on a rotary shaker at 280 cycles per minute at 25° C. for seven days. The contents of the flask are then acidified to pH 2.0 with sulfuric acid. The mixture is stirred for 15 minutes and filtered with the aid of Hyflo. The filtrate is adjusted to pH 9.0 with sodium hydroxide and extracted with three 350 ml. portions of n-butanol. The solvent phase is acidified to pH 2.2 with sulfuric acid and allowed to stand in the cold room for 65 hours. The solvent phase is then filtered and upon chromatographic examination in accordance with the procedure employed in Example 1 the presence of 7-chloro-6-demethyltetracycline, 7-chlorotetracycline and tetracycline is demonstrated in improved yield over that obtained in Example 4.

The n-butanol is then removed under high vacuum at 50° C. The brown viscous residue is suspended in a mixture of 100 ml. distilled water and 10 ml. of concentrated hydrochloric acid and heated at 75° C. for 30 minutes. After cooling, the mixture is adjusted to pH 1.8 with potassium hydroxide and filtered. The filtrate is extracted with 22 ml. of chloroform. The resulting aqueous layer is extracted with 100 ml. n-butanol. The butanol extract, upon chromatographic examination according to the procedure employed in Example 1, demonstrated the presence of 7-chloro-6-demethyl-tetracycline. Only the slightest traces of other bioactive materials can be noted.

Similarly, following the procedure set forth in Example 5 but substituting an equivalent amount of S-2-isopropyl-DL-homocysteine for S-2-n-propyl-DL-homocysteine, there is obtained 7-chloro-6-demethyltetracycline in improved yield over that obtained in Example 4.

This invention may be variously otherwise embodied within the scope of the appended claims.

What is claimed is:

1. A process for the production of 7-chloro-6-demethyltetracycline which comprise cultivating a chlorotetracycline-producing strain of Streptomyces in an aqueous nutrient medium under aerobic conditions in contact with from about .05 to about 2.0 grams per liter of a compound selected from the group consisting of S-2-chloroethyl-DL-homocysteine hydrochloride, S-2-hydroxyethyl-DL-homocysteine, DL-α-amino-γ-methoxybutyric acid, S-2-n-propyl-DL-homocysteine and S-2-isopropyl-DL-homocysteine.

2. A process for the production of 7-chloro-6-demethyl-tetracycline which comprises cultivating a 7-chlorotetracycline-producing strain of *Streptomyces aureofaciens* in an aqueous nutrient medium containing an available source of chloride ions under aerobic conditions in contact with from about .05 to about 2.0 grams per liter of a compound selected from the group consisting of S-2-isopropyl-DL-homocysteine and S-2-n-propyl-DL-homocysteine and also in contact with a small but effective amount of aminopterin.

3. A process for the production of 7-chloro-6-demethyl-tetracycline which comprises cultivating a chlorotetracycline-producing strain of Steptomyces in an aqueous nutrient medium under aerobic conditions in contact with from about .05 to about 2.0 grams per liter of S-2-chloroethyl-DL-homocysteine hydrochloride.

4. A process for the production of 7-chloro-6-demethyl-tetracycline which comprises cultivating a chlorotetracycline-producing strain of Streptomyces in an aqueous nutient medium under aerobic conditions in contact with from about .05 to about 2.0 grams per liter of S-2-hydroxyethyl-DL-homocysteine.

5. A process for the production of 7-chloro-6-demethyl-tetracycline which comprises cultivating a chlorotetracycline-producing strain of Streptomyces in an aqueous nutrient medium under aerobic conditions in contact with from about .05 to about 2.0 grams per liter of DL-α-amino-γ-methoxybutyric acid.

6. A process for the production of 7-chloro-6-demethyl-tetracycline which comprises cultivating a chlorotetracycline-producing strain of Streptomyces in an aqueous nutrient medium under aerobic conditions in contact with from about .05 to about 2.0 grams per liter of S-2-n-propyl-DL-homocysteine.

7. A process for the production of 7-chloro-6-demethyl-tetracycline which comprises cultivating a chlorotetracycline-producing strain of Streptomyces in an aqueous nutrient medium under aerbic conditions in contact with from about .05 to about 2.0 grams per liter of S-2-isopropyl-DL-homocysteine.

References Cited in the file of this patent

UNITED STATES PATENTS

| 3,012,946 | Szumski | Dec. 12, 1961 |
| 3,019,172 | Goodman et al. | Jan. 30, 1962 |
| 3,028,311 | Perlman et al. | Apr. 3, 1962 |
| 3,050,446 | Goodman | Aug. 21, 1962 |